US007711553B2

(12) United States Patent
Nam (10) Patent No.: US 7,711,553 B2
(45) Date of Patent: May 4, 2010

(54) METHODS AND APPARATUS FOR BLIND SEPARATION OF MULTICHANNEL CONVOLUTIVE MIXTURES IN THE FREQUENCY DOMAIN

(76) Inventor: Seung Hyon Nam, # 7-1503 Hatnim Apartment, Dunsan-dong, Seo-gu, Daejeon (KR) 302-737

( * ) Notice: Subject to any disclaimer, the term of this patent is extended or adjusted under 35 U.S.C. 154(b) by 945 days.

(21) Appl. No.: 10/588,197

(22) PCT Filed: Feb. 26, 2005

(86) PCT No.: PCT/KR2005/000526

§ 371 (c)(1),
(2), (4) Date: Aug. 2, 2006

(87) PCT Pub. No.: WO2005/083706

PCT Pub. Date: Sep. 9, 2005

(65) Prior Publication Data

US 2008/0208570 A1      Aug. 28, 2008

(30) Foreign Application Priority Data

Feb. 26, 2004      (KR)      ............. 10-2004-0013016

(51) Int. Cl.
*G10L 21/00* (2006.01)
(52) U.S. Cl. .............. 704/201; 704/216; 704/217; 704/218
(58) Field of Classification Search .......... 704/201, 704/216, 217, 218
See application file for complete search history.

(56) References Cited

U.S. PATENT DOCUMENTS 5,208,786 A     5/1993   Weinstein et al.

6,167,417 A *   12/2000  Parra et al. ............. 708/405
6,625,587 B1 *  9/2003   Erten et al. ............. 706/22
6,654,719 B1 *  11/2003  Papadias ................ 704/233
2004/0117186 A1 * 6/2004 Ramakrishnan et al. ..... 704/255
2006/0053002 A1 * 3/2006 Visser et al. ............ 704/200

FOREIGN PATENT DOCUMENTS

EP      0 779 709       6/1997
JP      2003-078423     3/2003

\* cited by examiner

*Primary Examiner*—Qi Han
(74) *Attorney, Agent, or Firm*—Jae Y. Park; Kile Goekjian Reed & McManus (57) ABSTRACT

A method and apparatus performing blind source separation using frequency-domain normalized multichannel blind deconvolution. Multichannel mixed signals are frames of N samples including r consecutive blocks of M samples. The frames are separated using separating filters in frequency domain in an overlap-save manner by discrete Fourier transform (DFT). The separated signals are then converted back into time domain using inverse DFT applied to a nonlinear function. Cross-power spectra between separated signals and nonlinear-transformed signals are computed and normalized by power spectra of both separated signals and nonlinear-transformed signals to have flat spectra. Time domain constraint is then applied to preserve first L cross-correlations. These alias-free normalized cross-power spectra are further constrained by nonholonomic constraints. Then, natural gradient is computed by convolving alias-free normalized cross-power spectra with separating filters. After the separating filters length is constrained to L, the separating filters are updated using the natural gradient and normalized to have unit norm. Terminating conditions are checked to determine if separating filters converged.

6 Claims, 8 Drawing Sheets

TIME, [sec]

METHODS AND APPARATUS FOR BLIND SEPARATION OF MULTICHANNEL CONVOLUTIVE MIXTURES IN THE FREQUENCY DOMAIN

TECHNICAL FIELD

This invention relates to signal processing, more particularly to a method, apparatus, and storage medium that contains a program for performing blind signal separation of multichannel convolutive mixtures in the frequency domain.

BACKGROUND ART

In the art of speech processing, it is necessary to separate mixtures of multiple signals (including speech signals) from multiple sensors in a multipath environment. Such a separation of the mixtures without a priori knowledge of signals is known as blind source separation (BSS). BSS is very useful to separate signals that are from independent sources such as multiple speakers and sonar arrays. BSS techniques may be applied to speaker location tracking, speech recognition, speech coding, 3-D object-based audio signal processing, acoustic echo cancellers, channel equalization, estimation of direction of arrival, and detection of various biological signals such as EEG and MEG.

Most BSS techniques try to recover the original signals by nullifying the effect of multi-path effects. Although filters of infinite length are required for this purpose in general, filters of finite length also provide sufficient separation in most real world environments.

There are two popular approaches to this BSS problem: (i) multiple decorrelation (MD) methods that exploit the second order statistics of signals as independence measure and (ii) multichannel blind deconvolution (MBD) methods that exploit the higher order statistics.

The MD methods decorrelate mixed signals by diagonalizing second order statistics. [See, e.g. E. Weinstein, M. Feder, and A. V. Oppenheim, "Multi-channel signal separation by decorrelation," *IEEE Trans. Speech Audio Processing*, vol. 1, no. 4, pp. 405-413, April 1993; Lucas Parra and Clay Spence, "Convolutive blind source separation of nonstationary sources", *IEEE IEEE Trans. Speech Audio Processing*, pp. 320-327, May, 2000; D. W. E. Schobben and P. C. W. Sommen, "A frequency-domain blind signal separation method based on decorrelation," *IEEE Trans. Signal Processing*, vol. 50, no. 8, pp. 1855-1865, August 2002; N. Murata and S. Ikeda, and A. Ziehe, "An approach to blind source separation based on temporal structure of speech signal," *Neurocomputing*, vol. 41, no. 4, pp. 1-24, 2001] Diagonalization should be performed at multiple time instants for successful separation of signals. For this reason, these methods are only applied to nonstationary signals. These methods are quite fast and stable. The MBD methods, on the other hand, separate signals by minimizing mutual information of non-linear-transformed separated signals which are transformed by a nonlinear function matched to statistical distributions of signals. [See, e.g. S. Amari, S. C. Douglas, A. Cichocki, H. H. Yang, "Novel on-line adaptive learning algorithm for blind deconvolution using the natural gradient approach", *Proc. IEEE 11th IFAC Symposium on System Identification*, Japan, 1997, pp. 1057-1062; A. J. Bell and T. J. Sejnowski, "An information maximization approach to blind separation and blind deconvolution," *Neural Computation*, 7, no. 6, pp. 1129-1159, November 1995; L. Zhang, A. Cichocki, and S. Amari, "Geometrical structures of FIR manifolds and their application to multichannel blind deconvolution," *Proc of Int. IEEE Workshop on Neural Networks and Signal Processing*, pp. 303-312, Madison, Wis., USA, Aug. 23-25, 1999]

DISCLOSURE

Technical Problem

In the prior art, the separation performances are significantly limited due to their shortcomings such as frequency permutation, whitening, and filter types employed.

The MD methods suffer from the frequency permutation problem—the separated sources are differently ordered in each frequency bin so that the resulting separated signals are still mixed. Although there are some solutions to this permutation problem, separation performance is degraded as the length of separating filters increase. On the other hand, the MBD methods suffer from whitening effect—the spectra of separating signals are whitened (or flattened). The linear predictive method for speech signals has been proposed as a solution for this shortcoming of the MBD methods. [See, e.g., S. C. Douglas, "Blind separation of acoustic signals", in *Microphone Arrays: Signal processing techniques and applications*, M. Brandstein and D. Ward Eds, Springer, pp. 355-380, 2001.] This method employs bidirectional filters that may be inappropriate normal mixing environments in practice. In addition, parts of room impulse response may be treated as vocal track response of human speech signals.

Therefore, there is a need for a BSS technique that separates speech signals fast and accurately with high speech quality.

Technical Solution

This invention provides a method and apparatus of multichannel blind deconvolution, that estimates unidirectional separating filters for blind signal separation, with normalized natural gradient in the block frequency domain.

Figure 1:
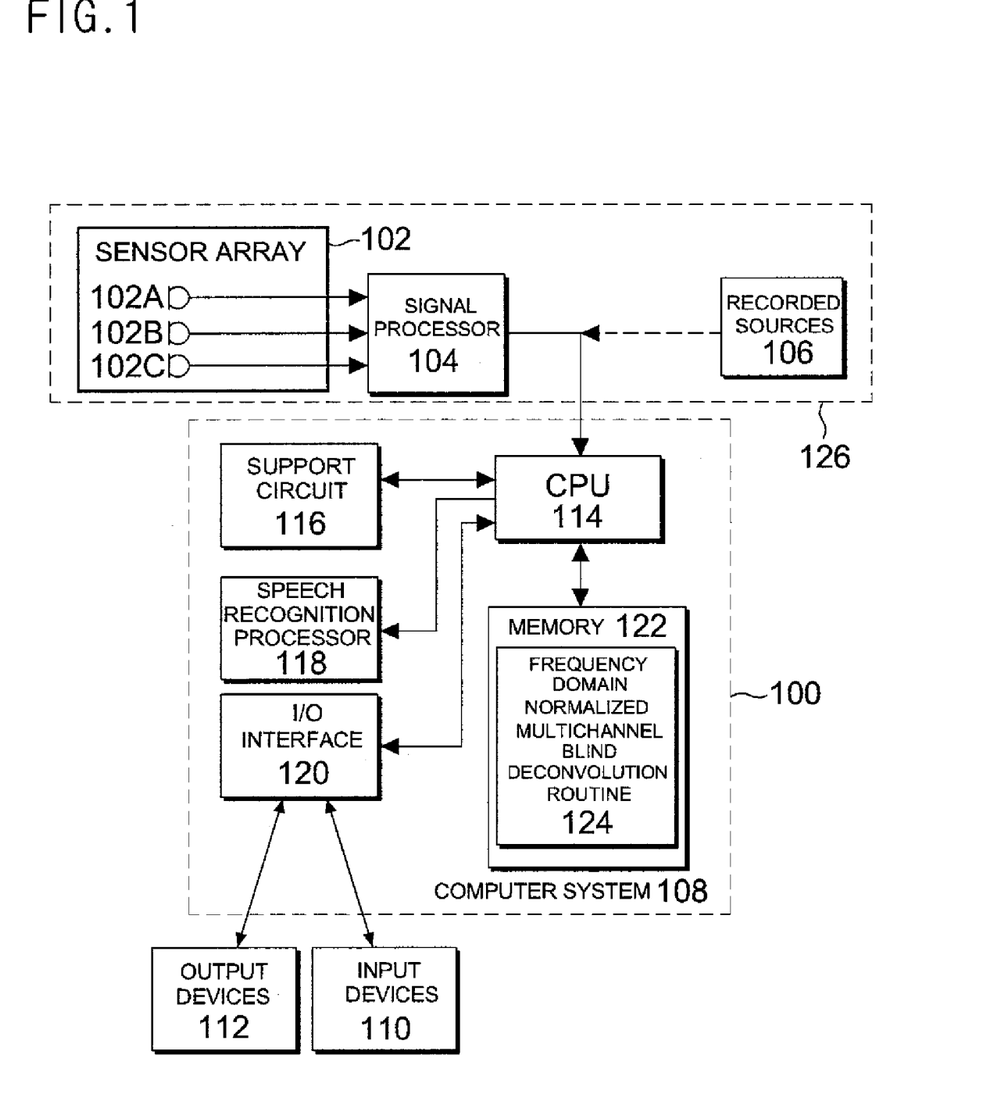
FIG. 1 depicts a system for executing a software implementation of the present invention.

FIG. 1 depicts a system 100 for executing signal separation of the invention. The system 100 comprises an input device 126 that supplies the mixed signals that are to be separated and a computer system 108 that executes the frequency-domain normalized multichannel blind deconvolution routine 124 of the present invention. The input device 126 may contain any types of devices, but is illustratively shown to contain a sensor array 102, a signal processor 104 and a recorded signal source 106. The sensor array 102 contains one or more transducers 102A, 102B, 102C such as microphones. The signal processor 108 digitizes a (convolutive) mixed signal.

The computer system 108 comprises a central processing unit (CPU) 114, a memory 122, input/output (I/O) interface 120, and support circuits 116. The computer system is generally connected to the input device 110 and various input/output devices such as a monitor, a mouse, and a keyboard through the I/O interface 120. The support circuit 116 comprises well-known circuits such as power supplies, cache, timing circuits, a communication circuit, bus and the like. The memory 122 may include random access memory (RAM), read only memory (ROM), disk drive, tape drive, flash memory, compact disk (CD), and the like, or some combination of memory devices. The invention is implemented as the frequency-domain normalized multichannel blind deconvolution routine 124 that is stored in memory 122 and executed by the CPU 114 to process the signals from the input devices 126. As such, the computer system 108 is a general purpose computer system that becomes a specific purpose computer system when executing the routine 124 of the present invention. The invention can also be implemented in software, hardware or a combination of software and hardware such as application specific integrated circuits (ASIC), digital signal processor, and other hardware devices.

The illustrative computer system 108 further contains speech recognition processor 118, such as a speech recognition circuit card or a speech recognition software, that is used to process the separated signals that are extracted from the mixed signal by the invention. As such, mixed signals in a room having more than two persons speaking simultaneously with background noise or music can be captured by the microphone array 102. The speech signals captured by the microphones 102 are mixed signals that should be separated into individual components for speech recognition. The mixed signal is sent to the computer system 108 after filtered, amplified, and digitized by the signal processor 104. The CPU 114, executing the frequency-domain normalized multichannel blind deconvolution routine 124, separates the mixed signals into its component signals. From these component signals, background noise can be removed easily. The component signals without noise are then applied to the speech recognition processor 118 to process the component signals into computer text or computer commands. In this manner, the computer system 108, executing the frequency-domain normalized multichannel blind deconvolution routine 124, is performing signal preprocessing or conditioning for speech recognition processor 118.

Figure 2A:
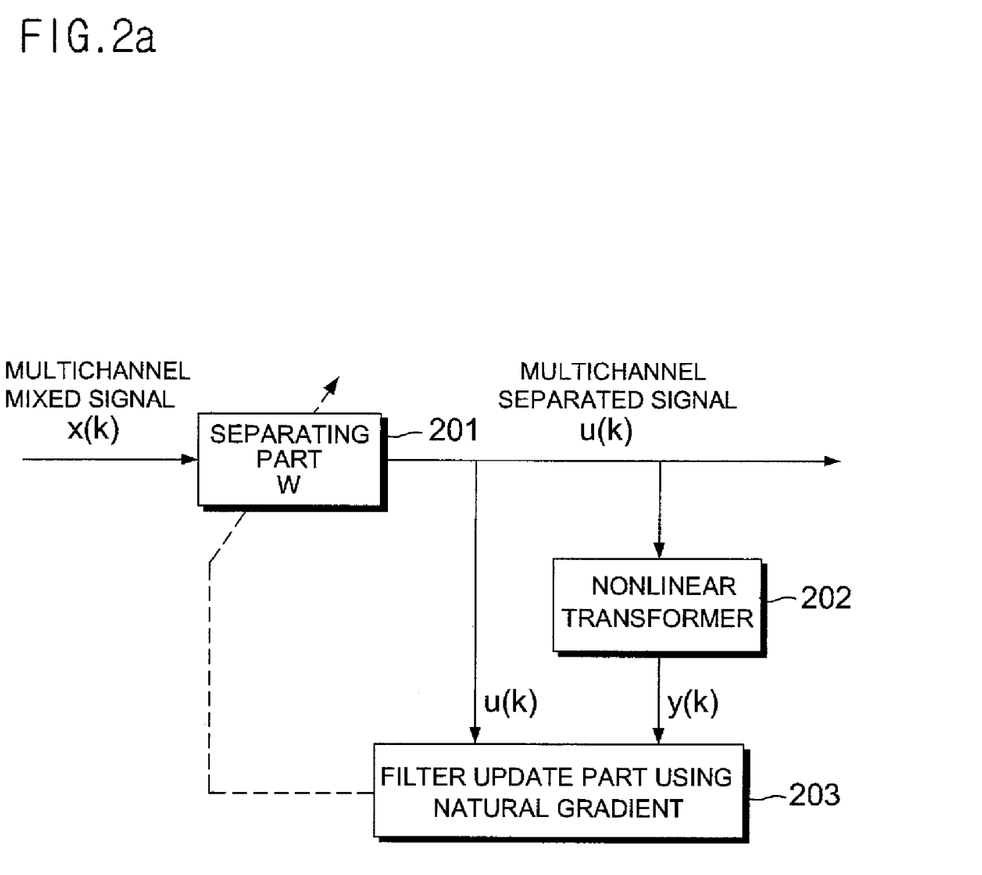
FIG. 2a depicts a block diagram of a multichannel blind deconvolution using normalized natural gradient.

FIG. 2a is a block diagram of the invention, a frequency-domain normalized multichannel blind deconvolution 124. The frequency-domain normalized multichannel blind deconvolution of the invention comprises a separation part 201, a nonlinear transformer 202, and a filter updating part 203 that updates separating filter coefficients using the normalized natural gradient. The separation part 201 separates a mixed multichannel signal x(k). The mixed signal x(k) is observed in a multipath environment as the output of the n sensors to the in component signals and is defined by the following equation:

$$x(k)=[x_1(k), x_2(k), \ldots, x_n(k)]^T \quad (1)$$

where $x_j(k)$ is the mixed signal from the j-th sensor. The separating filter to separate x(k) into its component signals is an n×n matrix W(z,k) whose (i,j) component is represented by the following equation:

$$w_{ij}(z,k) = \sum_{p=0}^{L-1} w_{ij,p}(k) z^{-p} \quad (2)$$

where L is the length of the separating filters. The separated component signal u(k) is defined by the following equation:

$$u(k)=[u_1(k), u_2(k), \ldots, u_m(k)]^T \quad (3)$$

Where $u_i(k)$ is the i-th separated signal defined by the following equation:

$$u_i(k) = \sum_{j=1}^{n} w_{ij,p}(k) x_j(k-p), i = 1, \ldots, m \quad (4)$$

Figure 2B:
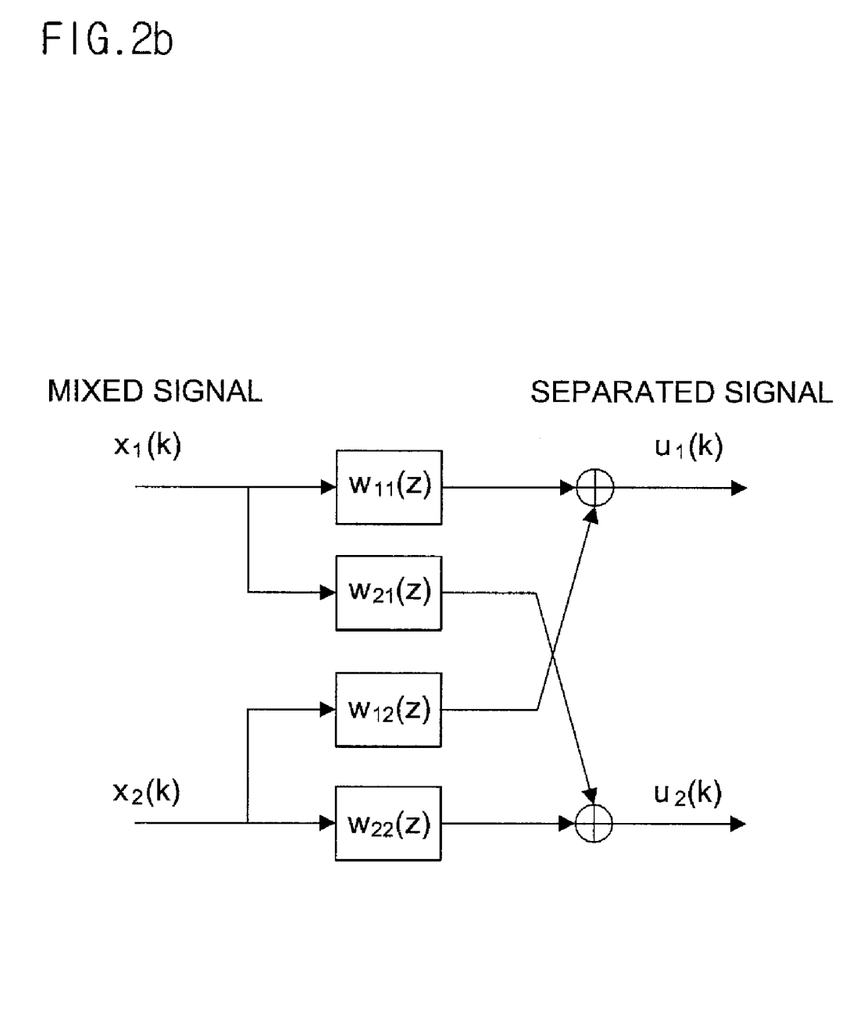
FIG. 2b depicts a diagram of separating filters to separate mixed multichannel signals.

FIG. 2b depicts a separating process for the case of m=n=2. The separated signal u(k) from the separation part 201 is applied to the nonlinear transformer 202.

The nonlinear transformer 202 performs transformation of the separated signal through a memoryless nonlinear function so that the nonlinear-transformed signal has a uniform probability density. The nonlinear transformation is defined by the following equation:

$$y_i(k)=f(u_i(k)), i=1, \ldots, m \quad (5)$$

Figure 2C:
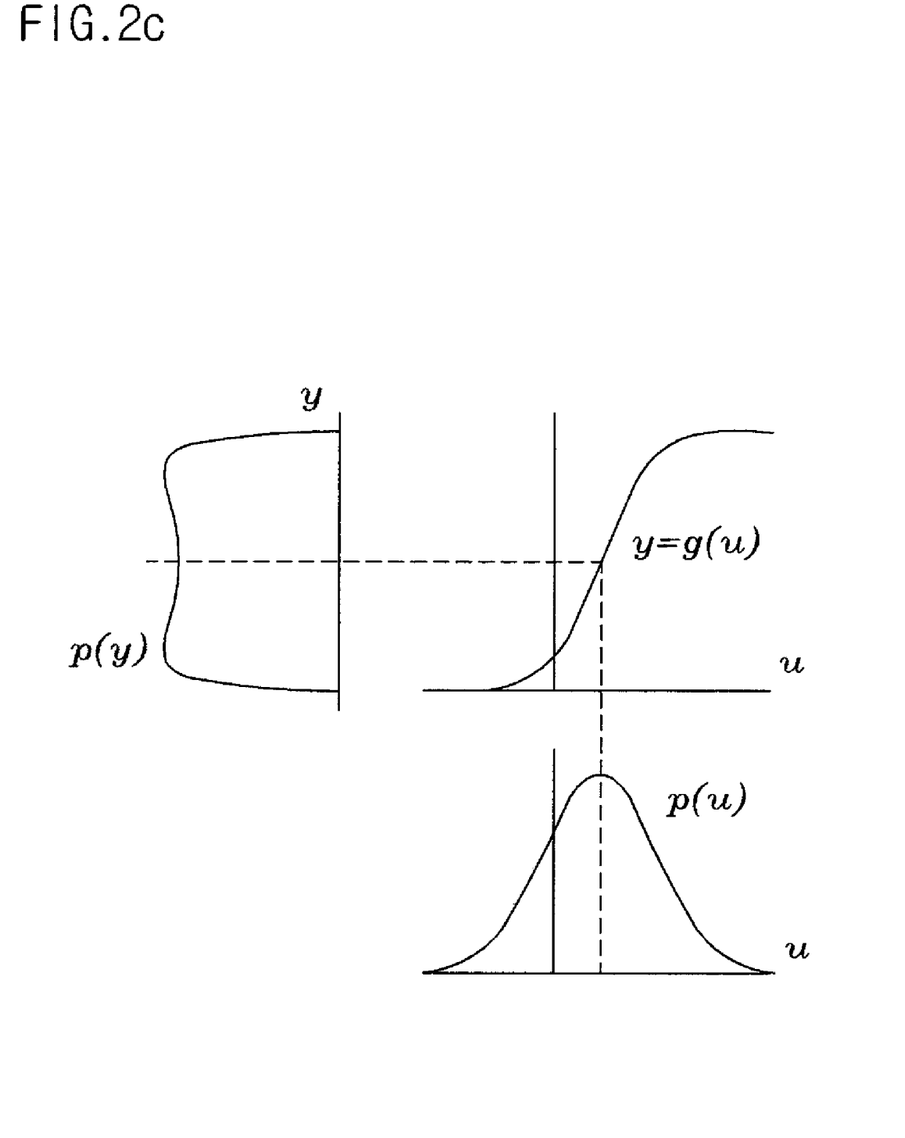
FIG. 2c depicts a schematic graph of transforming a separated signal into a signal with uniform probability density using a nonlinear function.

FIG. 2c is an illustration of the nonlinear transformation that a signal with Laplacian probability density is mapped into a signal with uniform probability density. A function to be used in the nonlinear transformation is closely related to the probability density. For audio and speech signals, $\alpha \text{sgn}(u)$ or $\tan h(u)$ is used in general.

The filter updating part 203 updates the separating filter coefficients using the steepest ascent rule with natural gradient by the following equation:

$$w_{ij,p}(k+1)=w_{ij,p}(k)+\mu \Delta w_{ij,p}(k) \quad (6)$$

for $1 \leq i \leq m$, $1 \leq j \leq n$, $0 \leq p \leq L-1$, where $\mu$ is the step size and $\Delta w_{ij,p}(k)$ is the natural gradient defined by the following equation:

$$\Delta w_{ij,p}(k) = \Delta w_{ij,p}(k) - \sum_{i=1}^{m} \sum_{q=0}^{p} \bar{y}_i(k) \bar{u}_l(k-p+q) w_{lj,q}(k) \quad (7)$$

Where $\bar{y}_i(k)$ and $\bar{u}_i(k)$ are the frequency-domain normalized versions, having flat spectrum, of $y_i(k)$ and $u_i(k)$, respectively. Note also that the filter lag q in equation (7) is limited up to p not up to L−1. In this invention the separating filter is unidirectional of length L. Thus no sample delay is required.

In this invention, the above mentioned process is performed in the frequency domain in an overlap-save manner to take the advantage of the FFT (Fast Fourier Transform). The filter length, the block length, the frame length are denoted as L, M, N, respectively. The amount of overlapping between frames is determined by the ratio r=N/M. In the sequel, 50% overlap is assumed (r=2) and the FFT size is assumed to be equal to the frame length for simplicity.

Figure 3:
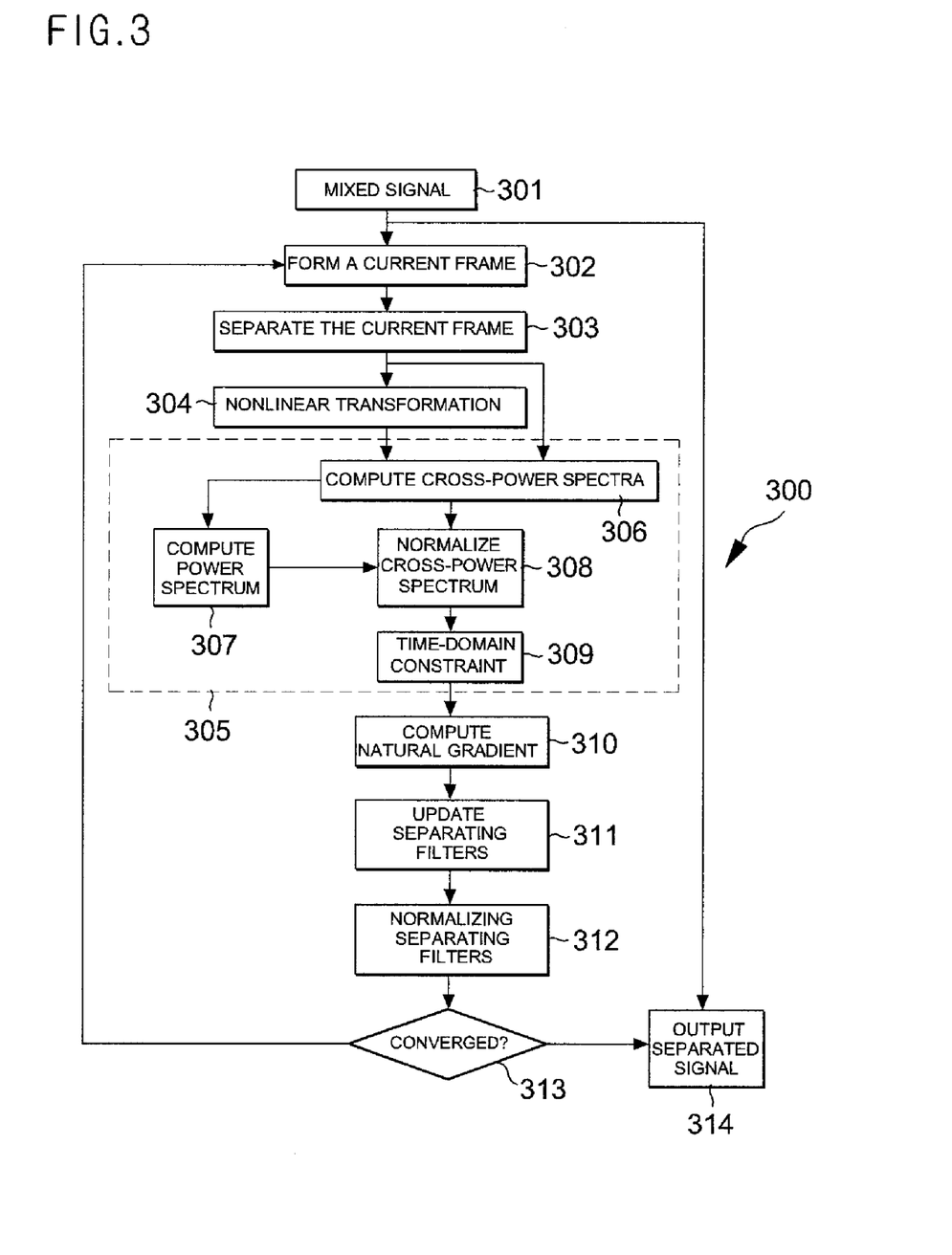
FIG. 3 depicts a flow chart of an embodiment of the present invention.

FIG. 3 depicts a flow chart of an embodiment of this invention, the frequency-domain normalized multichannel blind deconvolution. With reference to the flow chart, the mixed signal x(k) is input at step 301. At step 302, the mixed signal forms a current frame of two (r=2) consecutive blocks of M samples as follows:

$$x_j(b)=[x_j(bM-2M+1), \ldots, x_j(bM)]^T, j=1, \ldots, n \quad (8)$$

where b denotes the block index. At step 303, the mixed signal is separated using the separating filters $$w_{ij}(b)=[w_{ij,0}, w_{ij,1}, \ldots, w_{ij,L-1}]^T \quad (9)$$

The separating filters generally initialized as $$w_{ij}(0)=[1, 0, \ldots, 0]^T, i=j \quad (10a)$$

$$w_{ij}(0)=[0, \ldots, 0]^T, i \neq j \quad (10b)$$

If there is any useful information on the separating filters, however, the information can be utilized into initialization of the separating filters. The separated signal is computed in the frequency domain using circular convolution as in the following equation:

$$u_i(f, b) = \sum_{j=1}^{n} w_{ij}(f, b) \odot x_j(f, b) \quad (11)$$

where $\odot$ denotes the component-wise multiplication, and f denotes the frequency domain quantity such that $$w_{ij}(f,b) = F w_{ij}(b) \quad (12a)$$

$$x_j(f,b) = F x_j(b) \quad (12b)$$

where F is the N×N DFT matrix. The separated signal is then transformed back into the time domain in order to discard the first L aliased samples as in the following equation:

$$u_i(f,b) = P_{0,N-L} F u_i(f,b) = [0, \ldots, 0, u_i(bM-2M+L+1), \ldots, u_i(bM)]^T \quad (13)$$

where $P_{0,N-L}$ is the projection matrix (or window matrix) to make first L samples to zeros and is defined as follows:

$$P_{0,N-L} = \begin{pmatrix} 0_L & 0 \\ 0 & I_{N-L} \end{pmatrix} \quad (14)$$

where $0_L$ is the L×L zero matrix and $I_{N-L}$ is the (N−L)×(N−L) identity matrix.

At step 304, the separated signal is transformed via a nonlinear function in the time domain. One of two following equations can be used:

$$y_i(b) = f(u_i(b)) = [0, \ldots, 0, f(u_i(bM-2M+L+1)), \ldots, f(u_i(bM))]^T \quad (15a)$$

$$y_i(b) = f(u_i(b)) = [0, \ldots, 0, f(u_i(bM-2M+2L+1)), \ldots, f(u_i(bM))]^T \quad (15b)$$

The output of this nonlinear function is used to compute the cross-correlations $f(u_i(k))u_j(k-p)$, $p=0, 1, \ldots, L-1$ at step 306. If equation (15a) is used, the cross-correlations will be biased. If equation (15b) is used, the cross-correlations will be unbiased.

At step 305, the alias-free normalized cross-power spectra are computed. Step 305 is very critical in this invention. The normalized cross-power spectrum is defined by the following equation:

$$\overline{P}(b) = \begin{pmatrix} \overline{P}_{y_1 u_1}(b) & \cdots & \overline{P}_{y_1 u_m}(b) \\ \vdots & \ddots & \vdots \\ \overline{P}_{y_m u_1}(b) & \cdots & \overline{P}_{y_m u_m}(b) \end{pmatrix} \quad (16)$$

Where $\overline{P}_{y_i u_j}(f,b)$ is the normalized cross-power spectrum between $y_i(f,b)$ and $u_j(f,b)$ to be described below. If i=j, the expected value is normalized to 1 by Bussgang property. At step 306, the cross-power spectra are computed in the frequency domain by the following equation:

$$P_{y_i u_j}(f,b) = y_i(f,b) \odot u_j^*(f,b) \quad (17)$$

where * denotes the complex conjugation and $$y_i(f,b) = F y_i(b) \quad (18a)$$

$$u_j(f,b) = F u_j(b) \quad (18b)$$

Note that the cross-power spectra in equation (17) are computed using only the samples from the current frame as in equation (18a) and (18b). At step 307, the power spectra of the separated signals and the nonlinear-transformed signals are computed to normalize the cross-power spectra. In order to accommodate time varying nature of the signal, the power spectra are updated at each block as follows:

$$P_{y_i}(f,b) = (1-\gamma) P_{y_i}(f,b-1) + \gamma |y_i(f,b)|^2, i=1, \ldots, m \quad (19a)$$

$$P_{u_j}(f,b) = (1-\gamma) P_{u_j}(f,b-1) + \gamma |u_j(f,b)|^2, j=1, \ldots, m \quad (19b)$$

Here, $\gamma$ is a constant between 0 and 1. The power spectra are initialized as $P_{y_i}(f,0) = P_{u_i}(f,0) = c[1, \ldots, 1]^T, i=1, \ldots, m$, where c is a small positive constant 0<c<<1. At step 308, the cross-power spectra are normalized as follows:

$$\overline{P}_{y_i u_j}(f, b) = \frac{P_{y_i u_j}(f, b)}{\sqrt{P_{y_i}(f, b) \odot P_{u_j}(f, b)}} \quad (20)$$

where the division is performed in the component-wise. If the cross-power spectra in equation (20) are transformed back into the time domain, however, the resulting cross-correlations contain aliased parts. Furthermore, only the first L cross-correlations are required to compute the natural gradient in equation (7). Therefore, only the first L cross-correlations must be extracted. This is performed at step 309 by applying the proper time domain constraint in the time domain as follows:

$$\tilde{P}_{y_i u_j}(f,b) = F P_{L,0} F^{-1} \overline{P}_{y_i u_j}(f,b) \quad (21)$$

where $F^{-1}$ is the N×N inverse DFT matrix and $P_{L,0}$ is the N×N projection matrix, which preserves the first L samples and set the rest (N−L) samples to zeros, defined as $$P_{L,0} = \begin{pmatrix} I_L & 0 \\ 0 & 0_{N-L} \end{pmatrix} \quad (22)$$

At step 310, the natural gradient is computed using the nonholonomic constraints as follows:

$$\hat{P}_{y_i u_j}(f, b) = \begin{cases} \overline{1} - \tilde{P}_{y_i u_j}(f, b), & \text{for } i = j \\ -\tilde{P}_{y_i u_j}(f, b), & \text{for } i \neq j \end{cases} \quad (23a)$$

$$\Delta w_{ij}(f, b) = \sum_{l=1}^{m} \hat{P}_{y_i u_j}(f, b) \odot w_{ij}(f, b) \quad (23b)$$

where $\overline{1} = [1, \ldots, 1]^T$. The nonholonomicity implies that separation is not responding to signal powers but only to statistical dependence between signals.

Note that $\hat{P}_{y_i u_j}(f,b)$ in equation (23a) is approximately nonholonomic since the diagonal components $\tilde{P}_{y_i u_j}(f,b)$ are $\overline{1}$ on the average. However, exact nonholonomicity can be attained by forcing the diagonal components to zeros as:

$$\hat{P}_{y_i u_j}(f,b) = 0 \quad (24)$$

Although all the components of the separating filters are learned in general, all diagonal components can be omitted in learning so that the diagonal components are absorbed into the off-diagonal components. This is easily achieved in this invention by setting the diagonal components of the gradient to zero as follows:

$$\Delta w_{ii}(f,b)=0 \qquad (25)$$

If equation (24) and (25) are combined together, the computation can be reduced. Note that, for the special case of m=n=2, the time-domain constraints in equation (21) are not necessary and the computational burden is significantly reduced. Such flexibility for modifications is one advantage of the present invention.

At step 311, the separating filters are updated as:

$$w_{ij}(f,b+1)=w_{ij}(f,b)+\mu\Delta w_{ij}(f,b) \qquad (26)$$

At step 312, the separating filters are normalized in the frequency domain to have unit norm. The separating filters with unit norm preserve signal power during iteration.

At step 313, termination conditions are investigated whether the separating procedure should be terminated or not.

At step 314, the converged separating filters are used to filter the mixed signals to get the separated signals. Equation (11) in step 302 can also be used in this step.

Although various embodiments which incorporate the teaching of the present invention have been shown and described in detail herein, those skilled in the art can readily devise many other varied embodiments that still incorporate these teachings. Accordingly, it is intended that all such alternatives, modifications, permutations, and variations to the exemplary embodiments can be made without departing from the scope and spirit of the present invention.

ADVANTAGEOUS EFFECTS

Figure 4A:
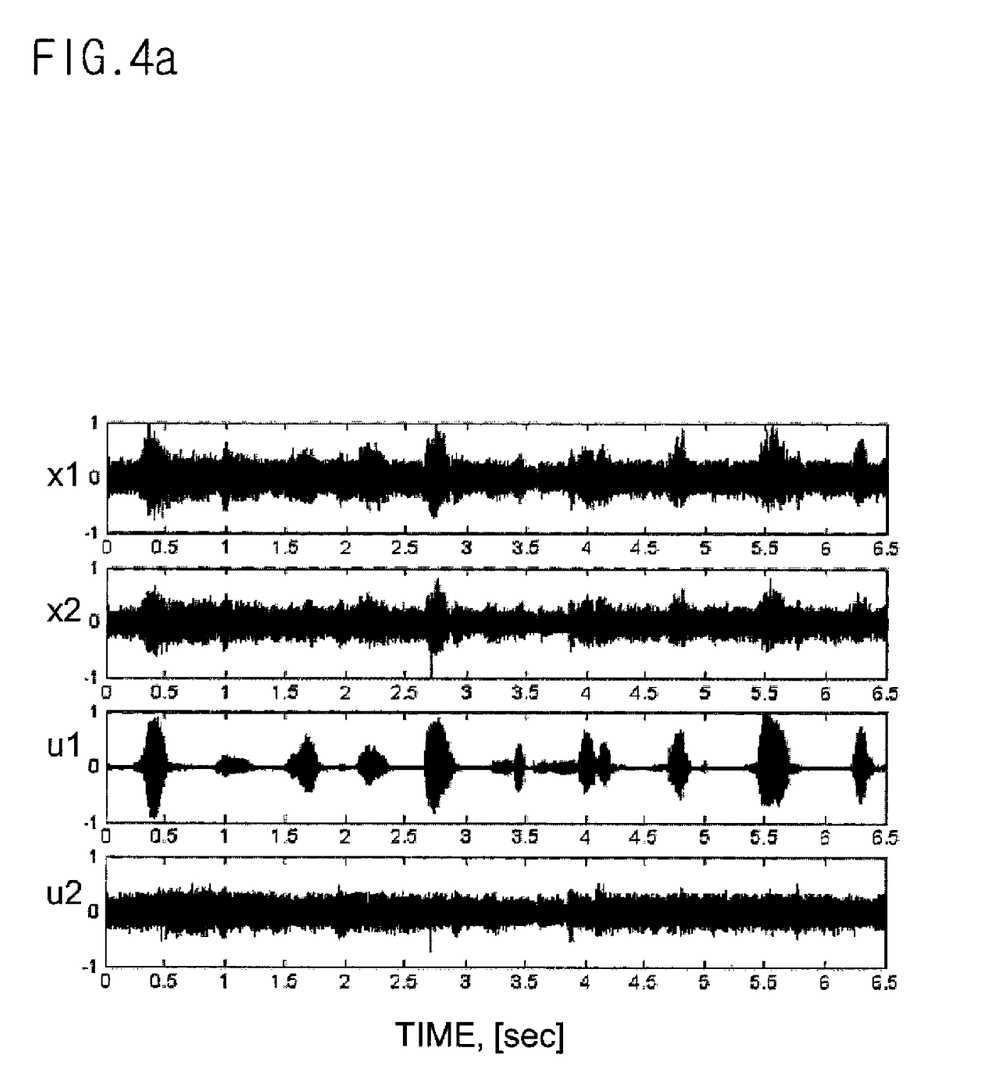
FIG. 4a depicts separated signals, speech and music, from mixtures recorded in a real room by the present inventive method.
Figure 4B:
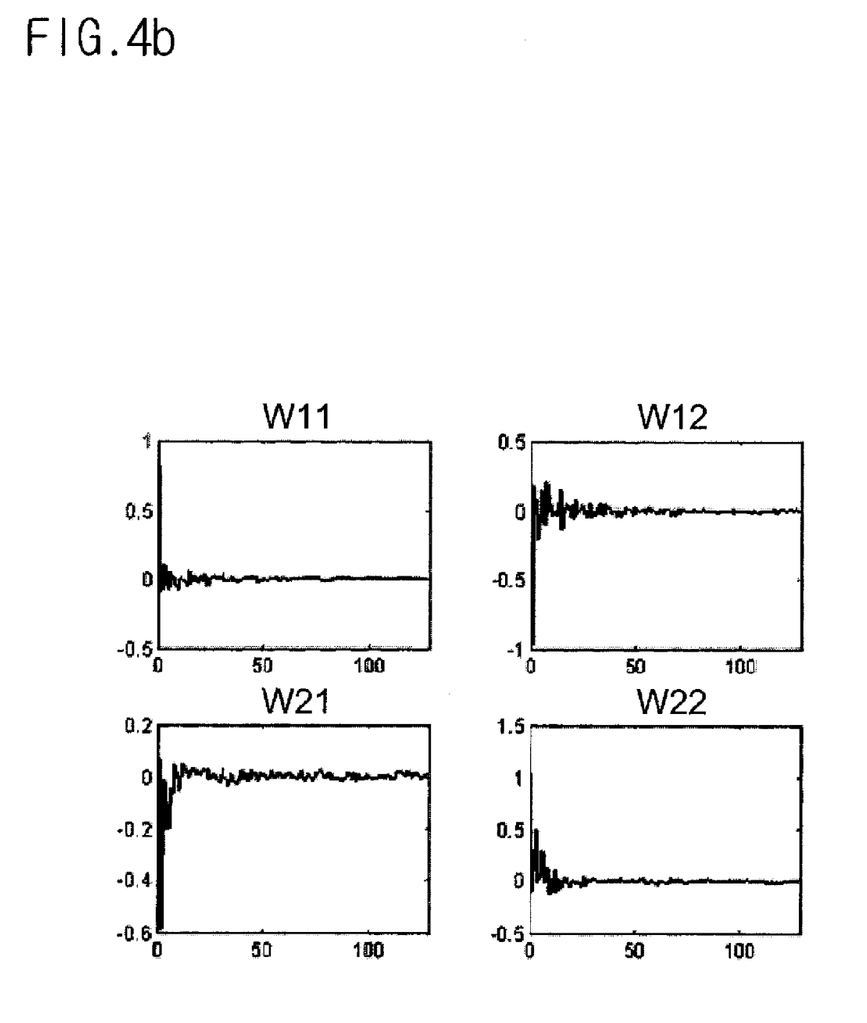
FIG. 4b depicts the final converged separating filters $w_{ij}$ to separate the mixtures recorded in a real room by the present inventive method.

FIG. 4a shows an example of separating mixed signals recorded in a real-world environment. Speech and music signals are recorded in a room using two microphones and the mixed signals are then separated using the inventive method. FIG. 4a shows two mixed signals $x=(x_1,x_2)$ and two separating signals $u=(u_1,u_2)$ from top to bottom. Parameters used are L=128, M=2L, N=2M, $\mu$=0.0025. FIG. 4b shows the final separating filters in this example.

Figure 5:
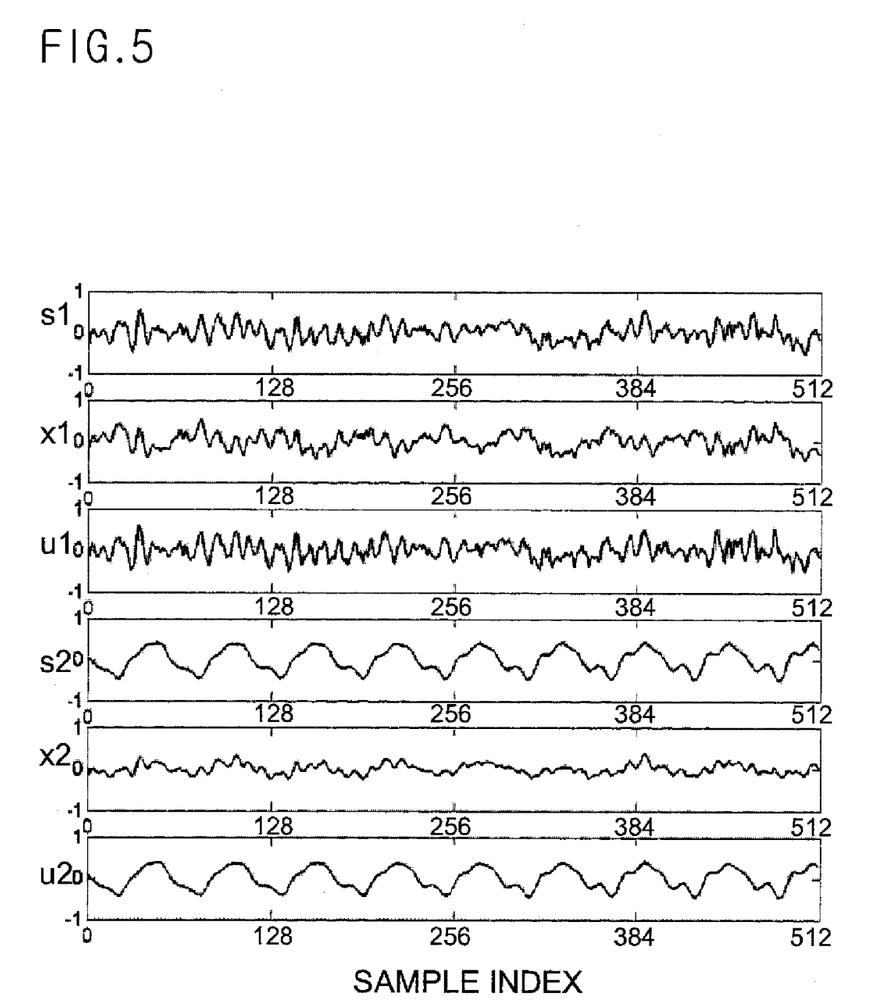
FIG. 5 depicts an original speech signal s, a mixed speech signal x, and a separated signal u for each channel.

This invention can separate a desired signal from the mixtures with high speech quality so that the separated signal can be directed to a speech recognizer or a speech coder. FIG. 5 shows the original signal s, the mixed signal x, and the separated signal u from top to bottom for each channel. FIG. 5 demonstrates high quality of the separated speech signals.

DESCRIPTION OF DRAWINGS

The teaching of the present invention can be readily understood by considering the following description in conjunction with accompanying drawings, in which.

INDUSTRIAL APPLICABILITY

The present invention finds application in a speech recognition system as a signal preprocessor system for deconvolving and separating signals from different sources such that a speech recognition processor can response to various speech signals without interfering noise sources.

The invention claimed is:

1. A method for separating mixed signals into component signals comprising:
   (a) producing current frames from said mixed signals;
   (b) separating said current frames into component signals of the current frame;
   (c) transforming said component signals using nonlinear functions into nonlinear-transformed signals;
   (d) computing aliasing-free normalized cross-power spectra of said component signals and said nonlinear-transformed signals in (c);
   (e) computing natural gradient using said cross-power spectra;
   (f) updating separating filter coefficients using said natural gradient;
   (g) normalizing said separating filter coefficients;
   (h) determining convergence conditions and iterating from (a) to (g) until convergence; and
   (i) separating said mixed signals into component signals using said separating filter coefficients after convergence.

2. The method of claim 1 wherein (b) further comprises:
   (b1) transforming said mixed frames and said separating filter coefficients into the frequency domain;
   (b2) computing component signals in the frequency domain, and thereby transforming said component signals back into the time domain; and
   (b3) zeroing first L samples of said component signals, thereby producing component signals.

3. The method of claim 1 wherein step (d) further comprises:
   (d1) transforming said component signals and said nonlinear-transformed signals into the frequency domain;
   (d2) computing cross-power spectra using said component signals and said nonlinear-transformed signals in the frequency domain;
   (d3) computing power spectra of said component signals and the power spectra of nonlinear-transformed signals;
   (d4) computing normalized cross-power spectra; and
   (d5) transforming said normalized cross-power spectra back into the time domain; and
   applying the time domain constraint for preserving only the first L samples.

4. The method of claim 1 wherein (e) further comprises:
   (e1) applying the nonholonomic constraints to said aliasing-free normalized cross-power spectra; and
   (e2) computing said natural gradient using said separating filter coefficients and said nonholonomic-constrained cross-power spectra.

5. An apparatus of claim 1 for separating a plurality of the mixed signals into a plurality of component signals using the frequency-domain normalized multichannel blind deconvolution method.

6. A computer readable storage medium of claim 1 containing a program that, when executed upon a general purpose computer system, causes the general purpose computer system to become a specific purpose computer system that separates a plurality of the mixed signals into a plurality of component signals using the frequency-domain normalized multichannel blind deconvolution method.

* * * * *